United States Patent [19]

Weber

[11] Patent Number: 4,620,617
[45] Date of Patent: Nov. 4, 1986

[54] AUTOMATIC BRAKE ADJUSTER

[75] Inventor: James L. Weber, West Bloomfield, Mich.

[73] Assignee: Rockwell International Corporation, Pittsburgh, Pa.

[21] Appl. No.: 698,066

[22] Filed: Feb. 4, 1985

[51] Int. Cl.$^4$ ............................................. F16D 65/56
[52] U.S. Cl. ............................. 188/196 BA; 188/71.9
[58] Field of Search .................. 188/71.2, 71.8, 71.9, 188/72.7, 72.9, 196 BA, 196 D, 196 P

[56] References Cited

U.S. PATENT DOCUMENTS

| | | | |
|---|---|---|---|
| 3,991,859 | 11/1976 | Coulter et al. | 188/71.9 |
| 4,278,152 | 7/1981 | Tosi | 188/71.9 |
| 4,378,863 | 4/1983 | Baum | 188/71.8 |
| 4,392,557 | 7/1983 | Franke | 188/71.9 |
| 4,399,894 | 8/1983 | Tribe | 188/71.9 |

Primary Examiner—Bruce H. Stoner, Jr.
Assistant Examiner—Michael P. Gilday

[57] ABSTRACT

A brake actuator shaft has a clutch on an inner end which drives a splined sleeve. The splined sleeve engages an inner projection to turn one piston part on another piston part and to effectively lengthen the piston part. When the shaft is turned by a brake lever, it operates an actuator which presses on the piston part and inward projection and which prevents further relative rotation of the piston parts, causing the clutch to slip. A gear on an outer surface of the rotating portion of the piston engages a pinion connected to a manual adjuster. A ratchet in the manual adjuster prevents rotation of the pinion and the gear in the piston shortening direction.

10 Claims, 4 Drawing Figures

AUTOMATIC BRAKE ADJUSTER

BACKGROUND OF THE INVENTION

Automatic brake adjusters for all types of brakes and especially for disc brakes are known. Usually the brake adjuster operates by a moving portion of the brake engaging a fixed portion of the brake apparatus to prevent excessive return movement of the brake applying member.

Disc brakes present a special problem because the clearance between the brake pad or brake shoe and the disc when the brake is not applied is very small. For that reason, the adjustment must be very small and automatic adjustment must occur in a very short movement of the brake apparatus.

SUMMARY OF THE INVENTION

The preesnt invention solves the problem of disc brake adjustment uniquely by relatively turning the piston portions while the brake applying lever is being turned until the brake force prevents further turning of the piston elements.

A brake lever is moved by any conventional means, for example, mechanical means or pneumatic means such as by a brake air cylinder. Turning of the lever turns one actuator element connected to the lever and expands the actuator in an axial direction so that the actuator pushes against a piston. In a conventional manner the piston pushes against a brake pad which in turn pushes against the disc face. An opposite reaction causes the caliper in which opposing pads are mounted to move axially, squeezing the disc between two opposing pads to apply the brakes. Each of the axial movements is small. To keep the movement small, it is necessary that the brake be automatically adjusted during its use. Because the movements are small, the adjustment is difficult. The present invention uniquely provides the adjustment by mounting a clutch on the end of the actuator shaft mounting a sleeve on the end of the actuator shaft and turning the sleeve with a clutch until axial pressure of the actuator against the piston prevents turning of the sleeve. The sleeve has external splines which engage internal teeth on an inward projection on the turntable piston portion. As soon as the actuator applies brake applying force on the piston, the piston portions can no longer relatively turn, and the sleeve slips in the shaft.

The rotating portion of the piston has a relatively large gear with radially extending teeth on its outer perimeter. The gear engages a relatively small pinion on the manual brake adjuster. The manual brake adjuster includes a ratchet which prevents rotation of the pinion, and thus, prevents rotation of the gear in a direction which would tend to shorten the piston. Because of the relatively large size of the gear and the relatively small size of the pinion, a small angular rotation of the gear effects a relatively large angular rotation of the pinion which is sufficient to move the ratchet to the new locking position.

A spring on the end of the shaft tends to push the adjustable portion of the piston in the direction of the actuator. That spring has several functions, one of which is to tend to encourage the engagement of the piston with the actuator to prevent slip. Another function of the spring is the movement of the rotatable piston portion in an axial direction away from the brake applying direction so that the rotatable piston portion may freely turn on threads interconnecting it to the slideable piston portion until brake applying force is applied by the actuator.

A preferred internal automatic brake adjuster for disc brakes has a shaft with first and second ends. A lever is connected to the first end of the shaft for rotating the shaft. Friction clutch means mounted on the second end of the shaft and annular spline means mounted on the second end of the shaft adjacent the friction clutch means rotate with the shaft until another force overrides the clutch and causes the spline means to slip on the shaft. A brake applying piston has first and second concentric portions which are connected by helical adjusting threads which permit relative turning of the elements in adjustment when the piston is not loaded. When brake applying force is applied to the piston, the helical threads lock the piston portions against turning. The turnable piston portion has an inward projection with teeth which engage the spline means which is mounted on the second end of the shaft. As the spline means turns with the shaft, the inward projection turns the turnable piston portion with respect to the non-turnable piston portion. The relative turning of the piston portions effects adjustment. The adjustment is prevented when the actuator applies brake applying force to the piston, whereupon the spline means and the friction clutch slip as the brake applying shaft is further turned.

In a preferred embodiment of the invention, the inward projection on the turnable piston portion is positioned adjacent the actuator.

In one preferred form of the invention, ratchet means is connected to the turnable portion of the piston means to prevent rotation of the turnable portion in a direction which would tend to shorten the piston means.

In a preferred form of the invention, the spline means is a collar mounted on a second end of the shaft with radially extending splines on the collar. The inward projection on the turnable piston portion is a flat circular plate which faces the actuator and which has inward projecting teeth to engage the spline means on the sleeve.

In a preferred embodiment, a washer is mounted on the second end of the shaft and a compression spring extends between a washer and the inward projecting plate to urge the plate and the piston in the direction of the actuator.

In one preferred embodiment, the friction clutch is a Belleville spring positioned between the washer and the sleeve for encouraging the sleeve to rotate with the shaft, washer, and Belleville spring.

In one preferred embodiment, the turnable piston portion has a large gear machined in its outer surface to engage a small pinion and a manual adjuster. The pinion is permitted to rotate in only one direction by a ratchet, which prevents rotation of the pinion and gear in a piston shortening rotation.

These and other and further objects and features of the invention are apparent in the disclosure which includes the specification with the above and ongoing description and the claims and the drawings.

DETAILED DESCRIPTION OF THE DRAWINGS

Figure 1:
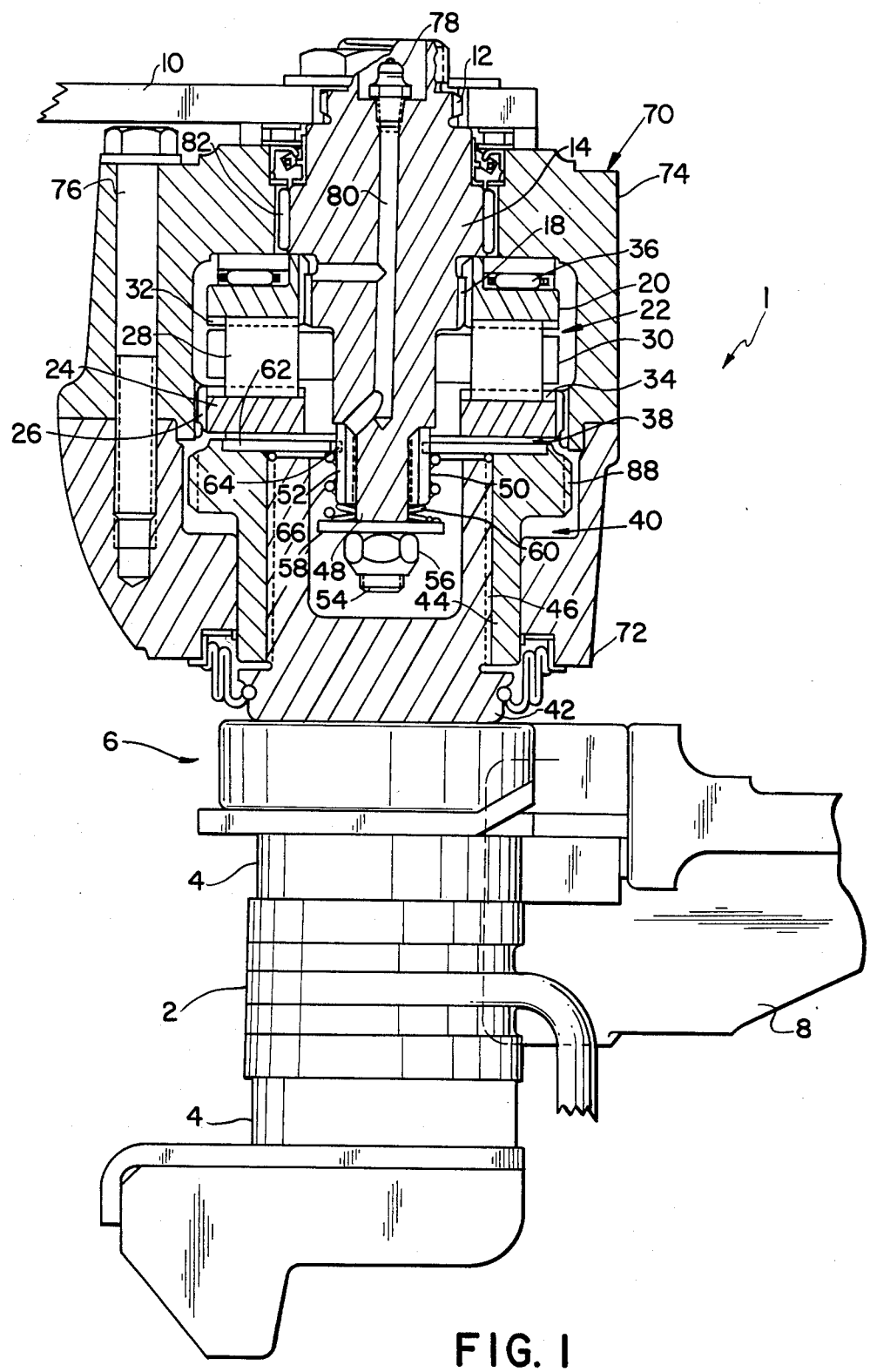
FIG. 1 is an elevational view partially in cross section of a disc brake apparatus showing the actuator and adjusting device.

Referring to FIG. 1, a disc brake apparatus is generally referred to by the numeral 1. Disc 2 is braked by opposing pads 4 which are mounted in a caliper generally indicated by the numeral 6. The caliper assembly 6 is mounted on a spider 8.

The brake is actuated by rotating lever 10 which is splined 12 to shaft 14. Shaft 14 is splined 18 to the first element 20 of an actuator generally indicated by the numeral 22. A second element 24 of the actuator is splined 26 to the brake housing so that the second element can not rotate as the shaft 14 is rotated. Rollers 28 are mounted in a cage 30 between the first actuator element 20 and the second actuator element 24.

As lever 10 and shaft 14 rotate the first actuator 20, rollers 28 ride up cam surfaces 32 and 34, which causes the actuator elements 20 and 24 to move axially apart. Actuator element 20 is supported by roller bearings 36 which prevent axial movement. Actuator element 24 pushes a pressure member 38 against piston 40, which tightens the caliper and squeezes brake pads 4 on opposite faces of rotor 2.

Over long use, the brake pads 4 wear. The length of piston 40 is adjustable to compensate for that wear.

Piston 40 has two parts, an inner element 42 and an outer element 44 which are interconnected by adjusting threads 46. Turning the outer member 44 on inner emmber 42 in one direction causes the piston to elongate. Helical threads 46 have slope which locks the piston elements 42 and 44 against rotation when brake applying force is applied to the piston 40.

Shaft 14, which has splines 12 on its first end, has a second end 48 which has a reduced diameter. A splined sleeve 50 with radially directed axially extending splines 52 is mounted for rotation on the reduced shaft second end 48. The extreme second end 54 of the shaft 14 is threaded to receive a nut 56 which holds a washer 58 on the shaft. A Belville spring 60 acts as a friction clutch to encourage the collar 50 to rotate with the shaft.

Outer piston member 44 has welded thereto at its end facing the actuator 22 an inward projecting plate 62 with inward extending teeth 64 which engage the splines 52 on collar 50. As the friction clutch 60 turns the collar 50 with shaft 14, the inner projection 62 turns the outer piston member 44 on the inner piston member 42, tending to elongate the piston 40. Compression spring 66 extends between the washer 58 and the inward projection 62, tending to move the piston 40 in the direction of actuator 22 and tending to unload the threads 46 so that the piston members 44 and 42 may relatively turn. When actuator element 24 presses against inward projection 62 and piston member 44, the piston applying force locks threads 46, preventing further rotation of the piston members. Belville spring friction clutch 60 then permits adjusting collar 50 to remain in position while shaft 14 turns within the adjusting collar.

Figure 2:
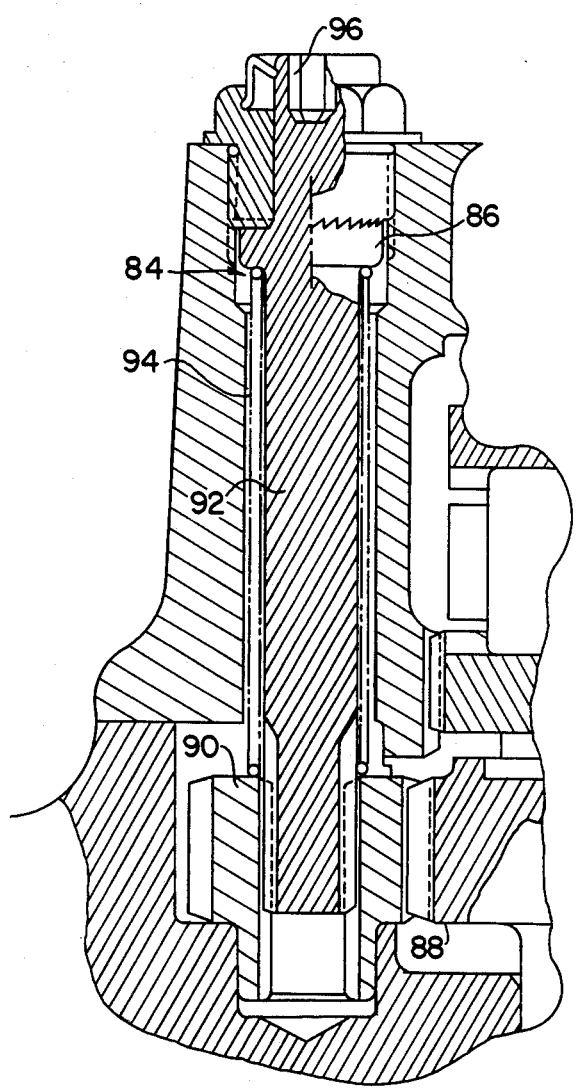
FIG. 2 is a cross-sectional detail of a manual adjuster showing a pinion and ratchet which permit adjustment of the brake only in the piston lengthening sense of rotation.

As shown in FIG. 1, the two elements 72 and 74 of the housing 70 are held together with bolts 76. Lubrication fitting 78 supplies lubricating channels 80 which in turn supply roller bearings 82 which support shaft 14 in housing 70 and which supply thrust roller bearings 36 and sleeve 50. As shown in FIG. 2, manual adjustment mechanism 84 contains a ratchet 86 which prevents relative rotation of piston member 44 on piston member 42 in a direction which would tend to shorten the piston.

As shown in FIG. 2, the piston member 44 is formed with a large outward extending gear 88, which engages a relatively small pinion 90. Pinion 90 is splined to adjusting shaft 92 which is fixed to the ratchet 86. As gear 88 turns pinion 90 in a direction which tends to elongate the piston, ratchet 86 turns to permit movement of the pinion and gear. Ratchet 86 prevents turning in the opposite sense of direction, and thus, prevents turning of pinion 90 and gear 88 in a direction which would tend to shorten the piston.

Spring 94 permits shaft 92 to move axially to release the ratchet as it is being turned. Shaft 92 may also be turned manually by inserting a wrench in socket 96.

Figure 3:
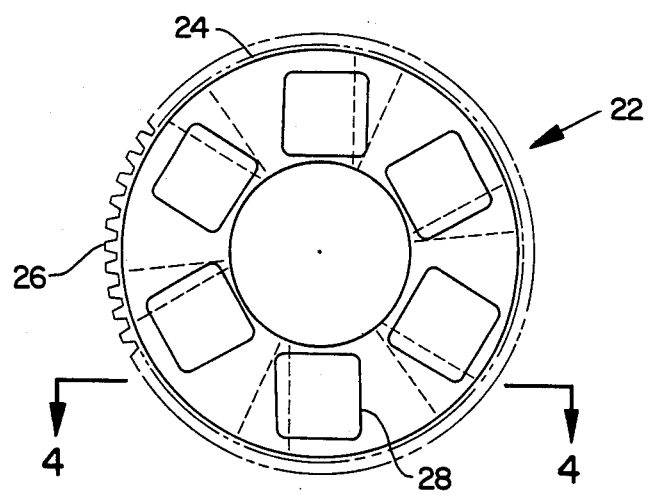
FIGS. 3 and 4 are details of the brake actuator shown in FIG. 1, FIG. 3 being taken along line 3—3 in FIG. 4 and FIG. 4 being taken along line 4—4 in FIG. 3.
Figure 4:
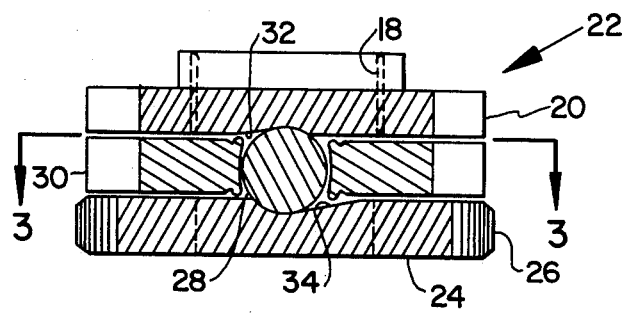

FIGS. 3 and 4 are details of the actuator 22. Rollers 28 move up cam surfaces 32 and 34 as actuator element 20 is rotated with the actuator shaft by the splines 18. That movement of the rollers 28 on the cam surfaces 32 and 34 causes the element 24 to slide axially. Splines 26 prevent rotation of element 24.

While the invention has been described with reference to specific embodiments, modifications and variations of the invention may be constructed without departing from the scope of the invention as defined in the following claims.

What I claim is:

1. Internal automatic brake adjuster apparatus for disc brakes comprising:
   (a) a shaft having first and second ends; wherein the second end of the shaft defines a spindle portion;
   (b) lever means connected to a first end of the shaft for rotating the shaft;
   (c) stop means mounted at an end of the spindle portion;
   (d) annular sleeve spline means mounted on the spindle portion of the shaft adjacent the second end having radially projecting and axially extending splines thereon;
   (e) spring friction clutch means mounted on the second end of the shaft between the stop means and a face of the annular sleeve whereby the friction clutch means turns the annular sleeve spline means with the shaft until the annular spline means encounters a predetermined resistance whereupon the shaft turns with respect to the annular spline means;
   (f) piston means having a radial inward portion and a radial outward portion wherein the inward portion has a brake applying face remote from the first end of the shaft and defines an axially extending cavity which receives the second end of the shaft and wherein the radial outward portion comprises an outer collar having internal threads engaging external threads on the inner piston portion whereby the outer piston portion may be turned relative to the inner piston portion to extend the length of the piston means;
   (g) inward projection means comprising an annular plate having an annular outward portion connected to a face of the outer piston portion in a direction of the first end of the shaft, the annular plate having a central opening with radially inward projecting splines engaging the splines on the annular sleeve; and (h) actuator means mounted on the shaft and engaging the piston means for moving the piston means in a brake applying direction upon turning of the shaft whereby turning the shaft causes the friction clutch to turn the annular sleeve spline means, and the annular sleeve spline means to turn the annular plate and the annular plate to turn the outer piston portion with respect to the inner piston portion to adjust the piston length until the actuator means forces the piston means in an axial direction, whereupon the friction clutch slips and the annular sleeve spline means no longer turns the annular plate.

2. The apparatus of claim 1 wherein the annular plate is positioned between the piston means and the actuator means.

3. The apparatus of claim 1 further comprising, ratchet means connected to the outer portion of the piston means for preventing turning of that piston portion with respect to the inner piston portion when the shaft means is turned in a non-brake actuating direction.

4. The apparatus of claim 1 further comprising a helical compression return spring means mounted between the stop means and the annular plate for biasing the plate axially with respect to the stop member, thereby biasing the piston portion and the piston means in the direction of the actuator.

5. The apparatus of claim 4 wherein the spring friction clutch means comprises Belleville spring means positioned between the stop means and the annular sleeve, and contacting the stop means and a radial end of the annular sleeve facing the stop means with the axial force sufficient to turn the sleeve with the shaft.

6. The apparatus of claim 5 wherein the stop means comprises a washer mounted on a reduced diameter portion of the shaft.

7. The apparatus of claim 1 further comprising return spring means mounted between the stop means and the annular plate for urging the annular plate in a direction towards the first end of the shaft and thereby urging the first piston portion and the second piston portion toward the first end of the shaft.

8. The apparatus of claim 7 wherein the actuator means connected to the shaft operates against the outer piston portion to urge the piston in the brake applying direction.

9. The apparatus of claim 8 wherein the annular plate faces the actuator means and further comprising a controlling washer mounted between the actuator means and the annular plate for permitting the plate and outer piston portion to turn with respect to the actuator until the actuator means and the annular plate are locked against rotation by axial brake applying force.

10. The apparatus of claim 9 further comprising ratchet means connected to the outer piston portion for preventing turning of the outer piston portion with respect to the inner piston portion when the shaft is turned in a direction opposite to the brake applying direction.

* * * * *